United States Patent
Roth

(10) Patent No.: US 6,430,666 B1
(45) Date of Patent: *Aug. 6, 2002

(54) LINKED LIST MEMORY AND METHOD THEREFOR

(75) Inventor: Alan Scott Roth, Austin, TX (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,909

(22) Filed: Aug. 24, 1998

(51) Int. Cl.[7] ................................................. G06F 12/00
(52) U.S. Cl. ........................ 711/202; 711/218; 711/219; 711/211
(58) Field of Search ................................ 711/202, 206, 711/218, 219, 211

(56) References Cited

U.S. PATENT DOCUMENTS

| | | | | |
|---|---|---|---|---|
| 4,173,783 A | * | 11/1979 | Couleur et al | 710/3 |
| 4,949,301 A | * | 8/1990 | Joshi et al. | 711/100 |
| 5,101,485 A | * | 3/1992 | Perazzoli, Jr. | 711/206 |
| 5,125,086 A | * | 6/1992 | Perazzoli, Jr. | 711/159 |
| 5,481,691 A | * | 1/1996 | Day, III et al. | 711/133 |
| 5,493,652 A | * | 2/1996 | Koufopavlou et al. | 711/170 |
| 5,555,339 A | * | 9/1996 | Waldron et al. | 711/159 |
| 5,555,399 A | * | 9/1996 | Waldron et al. | 711/159 |
| 5,809,560 A | * | 9/1998 | Schneider | 711/204 |

* cited by examiner

Primary Examiner—Mathew Kim
Assistant Examiner—Matt Anderson
(74) Attorney, Agent, or Firm—Joanna G. Chiu

(57) ABSTRACT

A linked list memory (8) having an address generator (19) used during initial processing and a method for assigning addresses to lists corresponding to devices using a common memory (10). When the address generator (19) has assigned each address location once, a free list is used to track available addresses. The free list is not used until all addresses have been assigned once. In one embodiment, a counter (22) is incremented each time an address is assigned, where the value of counter (22) provides the address for a write operation. The counter (22) is not effected by requests to read from memory. The free list is not used until the counter (22) has been used to assign all addresses in the memory (10).

19 Claims, 4 Drawing Sheets

LINKED LIST MEMORY AND METHOD THEREFOR

FIELD OF THE INVENTION

The present invention relates to memory systems in general, and specifically to memory systems incorporating linked lists.

BACKGROUND OF THE INVENTION

Often within a data processing system multiple processors and devices will access a common memory space. In such a case, it is necessary to coordinate the use and allocation of addresses within the common memory space so that each device addresses unique locations and avoids interference. For example, in a telecommunication switching system, such as an asynchronous transfer mode application (ATM), where multiple data ports share a the common memory space. One method of coordinating addresses involves the use of a linked list. The linked list is a copy of the common memory space, having a pointer associated with each memory address. Each device in the system has a list containing data to be stored in the data memory. The pointers indicate where the contents of the list are located in data memory.

The list pointers are compiled into a table, which may be maintained in software or in hardware. A list is typically designated as having a starting address, known as the "head" of the list, and an ending address, known as the "tail" of the list. The addresses between the head and tail are not necessarily sequential, and are typically spread throughout data memory. The list pointer then keeps track of all of the addresses that are contained within the list.

When the lists are implemented in hardware, control logic is used to update the list pointer, and to interface with the memory. Often this control logic will be some type of an application specific integrated circuit (ASIC) device which is specially designed and separate from the memory integrated circuit. ASIC solutions do not typically optimize access speed, and are expensive.

When designating addresses within a memory space it is desirable to use the entire memory space. Software implementations increase memory processing time, creating a problem in many faster memories. While it is desirable to implement these memory systems in hardware so as to increase the speed of memory access needed in fast memories, the linked list method may not always utilize all of the addresses within the memory.

There is a need for a linked list memory which provides the speed of a hardware implementation, while ensuring that all addresses within the main memory have been used.

DETAILED DESCRIPTION OF THE DRAWINGS

The present invention provides a method of forming a linked list in memory using an address selection unit, or address generator. The address generator assigns addresses to each of multiple lists, where each list corresponds to a device which uses the memory. The address generator assigns each of the address locations in the memory only once, and after all addresses have been assigned once, a free list is used to track unused addresses, i.e. unused memory cells. The free list is not used until all addresses have been assigned once.

Figure 1:
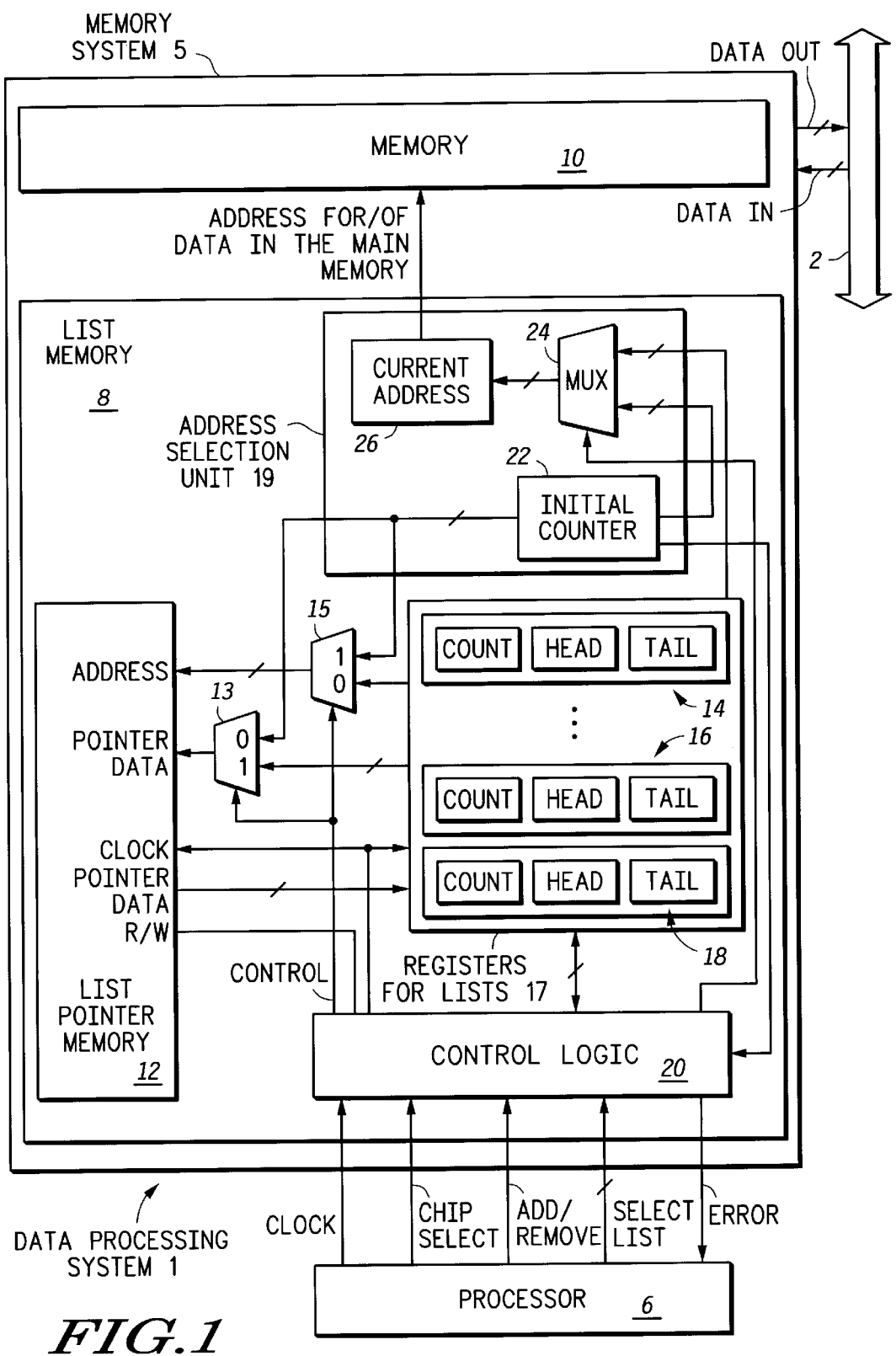
FIG. 1 illustrates, in block diagram form, a memory system 5 according to one embodiment of the present invention.

According to one embodiment illustrated in FIG. 1, the address generator is implemented using a counter 22, which is initialized on power on of the memory system. The counter 22 is incremented each time an address is assigned. The value of counter 22 is used to assign the address for each write operation. The counter value is output into a register 26, referred to as the "current address register." Addresses are assigned on each request for a write to memory. The counter is not effected by requests to read from memory. The free list is not used until the counter 22 has been used to assign all addresses in the memory 10. The free list also includes a counter which is initialized to a maximum value at power on of the memory system. The maximum value corresponds to the size of the memory, and indicates that all memory addresses are available for use. The free list counter is then incremented on each subsequent read operation, as after a read the address of the read is no longer in use. Note that on a read, if the list is empty the counter is not incremented as this address is already free. The free list counter indicates the number of available memory locations in memory 10. Similar to the read, the free list counter is decremented on each write operation, as to add data to memory 10 requires the use of a previously unused memory location.

FIG. 1 illustrates a data processing system 1, having a processor 6, a communication bus 2, and a memory system 5. Memory system 5 includes a memory 10 and list memory 8. List memory 8 communicates with other devices which use memory 10 by way of multiple conductors coupled to control logic 20. Control logic 20 is coupled to the other units within list memory 8, including list pointer memory 12, registers for lists 17, and address selection unit 19. List pointer memory 12 contains an entry corresponding to each location in memory 10. Unlike memory 10, list pointer memory 12 is used to store next addresses corresponding to each list.

Address selection unit 19 includes a current address register 26, a multiplexer 24, and an initial counter 22. The address selection unit 19 provides the value stored in current address register 26 to memory 10 and to list pointer memory 12. Memory 10 is used to store data associated with each list. Memory 10 receives data in through a bus which is coupled to a communication bus 2 within data processing system 1. Memory 10 provides data out via another bus, similarly coupled to communication bus 2. Alternate embodiments may employ a single bus for data communication into and out of memory 10. List memory 8 provides the addresses to be used in data transactions with memory 10.

Control logic 20 controls address generation and list maintenance within list memory 8. Control logic 20 provides control information to registers 17 by way of a bidirectional bus. Control logic 20 receives various signals from external to list memory 8, including a clock signal, a chip select signal, an add/remove signal, and a select list signal, and provides an error signal. These signals into control logic 20 are provided by processor 6. Control logic 20 provides a control signal to multiplexer (MUX) 15. One input of MUX 15 is coupled to the current address register 26 and a second input is coupled to registers 17. The output of MUX 15 is coupled to list pointer memory 12. In response to control from processor 6, MUX 15 provides address information to list pointer memory 12 from either current address register 26 or one of the list registers in registers 17. Control logic 20 also provides control signal to MUX 13. One input of MUX 13 is coupled to the current address register 26 and a second input is coupled to registers 17. The output of MUX 13 is coupled to list pointer memory 12. In response to control from processor 6, MUX 13 provides pointer information to list pointer memory 12 from either current address register 26 or one of the list registers in registers 17. Note that a single control signal from control logic 20 controls both MUX 13 and MUX 15, however, the polarity of MUX 15 is opposite to that of MUX 13. For example, when MUX 15 selects the current address register 26 to input into list pointer memory 12, MUX 13 selects registers 17 for input to list pointer memory 12. Data from list pointer memory 12 is provided by way of multiple conductors directly to register 17.

Address selection unit 19 includes current address register 26, multiplexer 24 and initial counter 22. Initial counter 22 provides its count value as an input to MUX 24 and also provides a control signal to control logic 20 to indicate when initial counter 22 is expired. Counter 22 may count up or count down, where expiration means that counter 22 has incremented or decremented through the entire count of the counter 22. The output of MUX 24 is provided as the input to current address register 26 by way of multiple conductors. Mux 24 also has an input which is coupled to register 17 by way of multiple conductors. In this way, MUX 24 is used to select the current address from either initial counter 22 or one of registers 17.

Figure 2:
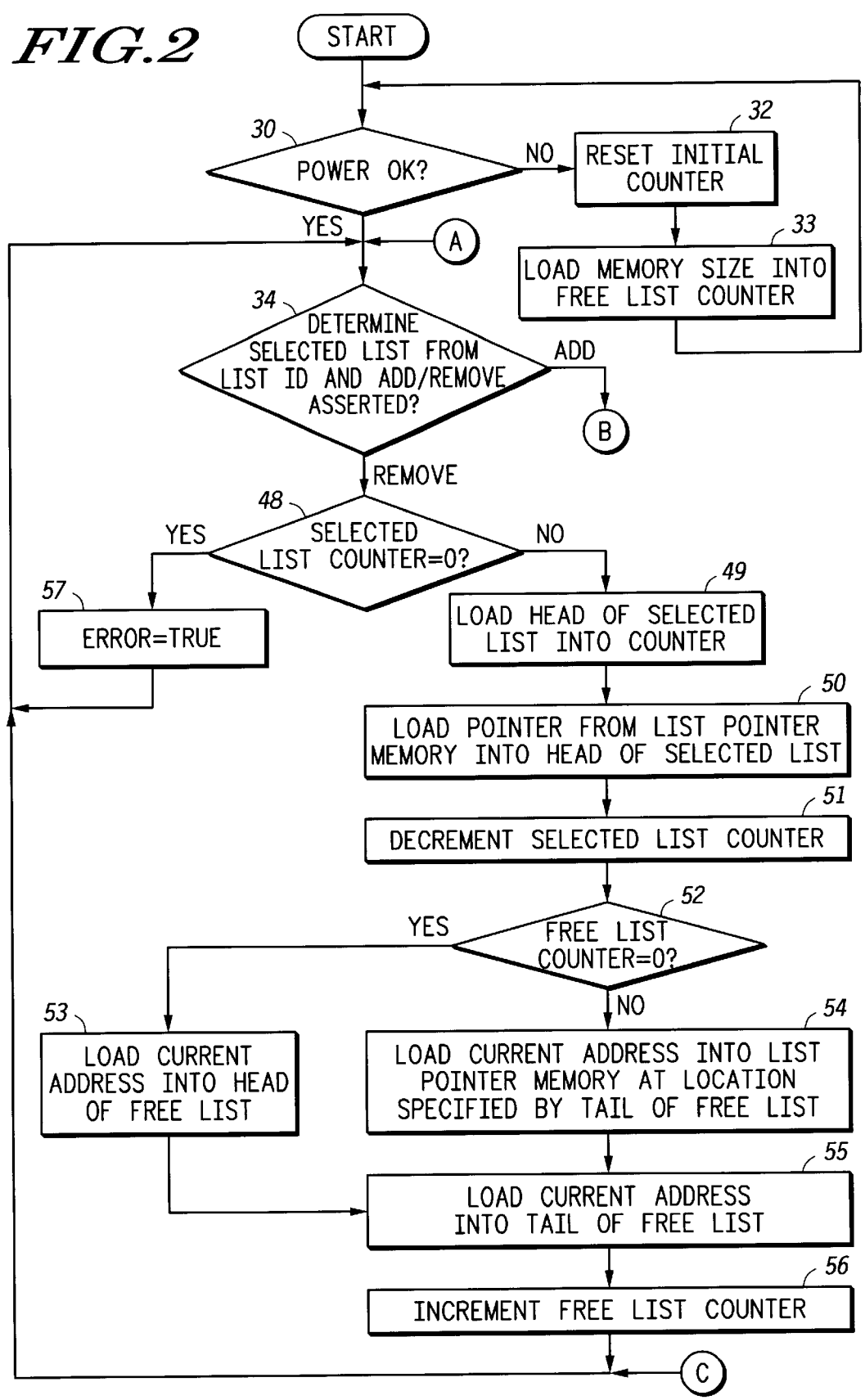
FIGS. 2 and 3 illustrate, in flow diagram form, the operation of memory system 5 of FIG. 1.
Figure 3:
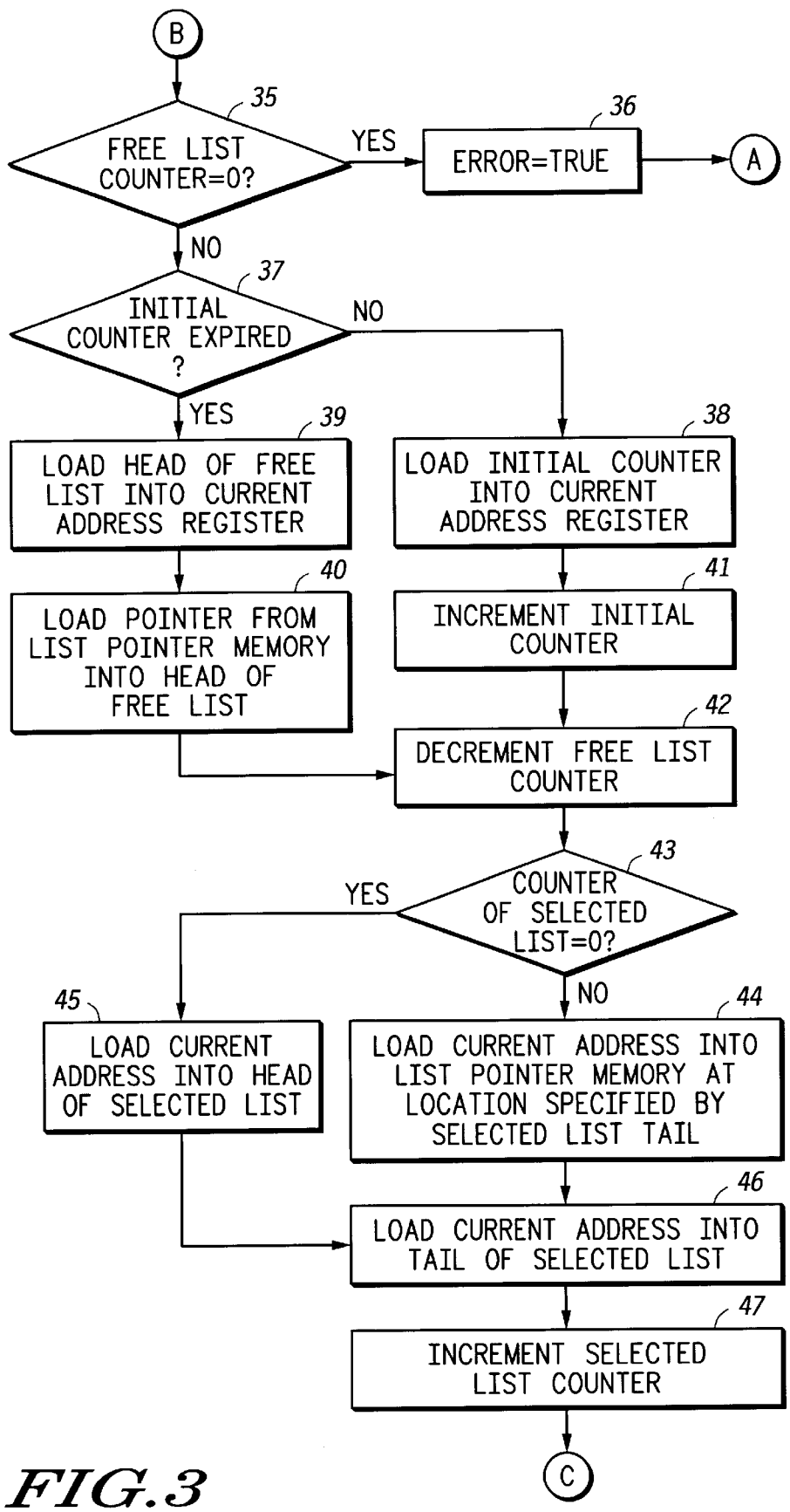

FIGS. 2 and 3 illustrate the operation of memory system 5 of FIG. 1. At the start of processing, it is determined if the power supply to the memory system 5 is stable. This is indicated by decision diamond 30. If the supply voltage is stabilized and processing is ready to continue, process flow proceeds to decision diamond 34. If the power is not yet stable, processing continues to block 32 to reset the initial counter and then to block 33 to load the memory size into free list counter. Processing flow then returns to decision diamond 30 to wait until power has stabilized.

At decision diamond 34 a selected list is determined from a select list signal provided to control logic 20 by processor 6. Concurrently, all of the input signals to control logic 20 are sampled. The add/remove signal indicates a request to write or read to memory 10, respectively. The logical level of the signal indicates the direction of the data transaction with memory 10. At this point it is then determined if the next operation is to add or remove data. If an add is indicated, processing flow continues to decision diamond 35 to determine if the free list counter is equal to zero. The free list counter is the counter associated with the free list within registers 17. If the free list counter is equal to zero, an error is detected and control logic 20 provides an error signal as an output at block 36. The error is generated as the zero in the free list counter indicates that there are no available memory locations in memory 10, and therefore, no locations available for the add, i.e. write.

From diamond 36, processing flow returns to decision diamond 34. If the free list counter does not equal zero, processing flow continues to decision diamond 37 to determine if the initial counter 22 has expired. If the initial counter 22 has not expired, processing flow continues to block 38 to load the value of the initial counter 22 into the current address register 26. Processing flow then proceeds to block 41 where the initial counter 22 is incremented. Processing flow then continues to block 42, where the free list counter is decremented.

Returning to decision diamond 37, if the initial counter 22 has expired, processing flow continues to block 39. Here the value in the head portion of the register corresponding to the free list is copied into the current address register 26. Since the initial counter 22 has expired, all addresses have been assigned at least once, and therefore an available memory location is determined from the free list. The head of the free list indicates the first available memory location in memory 10. This value is therefore placed into the current address register 26 to allow the pending add operation. Processing flow then continues to block 40 where the pointer from the list pointer memory 12 is copied into free list head. The head of the free list is changed, as the previous head value is now going to be used to perform the add operation. The next available memory location in the free list is the address in list pointer memory 12 at the location of the current address register, and therefore becomes the head of the free list. Processing flow then continues to block 42, where the free list counter is decremented.

From block 42, processing flow continues to decision diamond 43 to determine if the counter of the selected list is equal to zero. A zero counter indicates that the selected list has no entries. If the counter of the selected list is equal to zero, processing flow proceeds to block 45, and the current address is copied from the current address register 26 into the head portion of the register corresponding to the selected list. The current address is only copied into the head of the selected list when there are no entries in the list. Once an entry is made into a list, the head is unchanged on adds to the list. The head is always altered on remove operations. If the counter of the selected list does not equal zero, then the list has at least one entry and processing flow continues to block 44. At block 44 the current address is copied from the current address register 26 into the list pointer memory 12 at the location specified by the tail portion of the register corresponding to the selected list. The selected list tail indicates the last entry in the list. From block 44 and from block 45 processing flow continues to block 46, where the current address is copied from the current address register 26 into the selected list tail of the selected list. The selected list tail is updated on each add operation, and is unchanged on a remove, as only adds increase the size of the selected list. Processing flow then continues to block 47 where the selected list counter is incremented. Note that for an add operation, where the initial counter has not expired, the initial counter is used to select addresses for list allocations. Once the initial counter has expired, address selection is performed using the free list. In this way the initial counter is used to ensure that all address locations within memory are each allocated once. After each address has been allocated once, the free list is used to keep track of addresses which have been removed.

Returning again to decision diamond 34, if the next operation indicated is to remove data from memory 10, processing flow continues to decision diamond 48. At decision diamond 48 if the selected list counter is equal to zero, processing flow continues to block 57 where an error is detected and the error signal is provided by control logic 20. The error is generated as the selected list is empty, i.e. counter equals zero, and the request is to remove data from an empty list. Processing flow then returns to decision diamond 34. If the selected list counter is not equal to zero, processing flow continues to block 49, where the head of the selected list is copied into the current address register 26. In this way, the address indicated by the head will be the first location from which data is removed. Processing flow continues to block 50 where the pointer is copied from the list pointer memory 12 into the head of the selected list. The head is altered to reflect the removal of data from the list. The value of the pointer in the list pointer memory 12 is the next address which contains valid data for the selected list. Processing flow proceeds to block 51 where the counter of the selected list is decremented.

Processing flow then continues to decision diamond 52 to determine if the free list is empty. If the free list is empty then the current address is copied from the current address register 26 into the head of the free list at block 53 and processing flow continues to block 55. If the free list is not empty the current address is copied into the list pointer memory at a location specified by the tail of the free list at block 54. Processing flow again continues to block 55. At block 55 the current address is copied from the current address register 26 into the tail of the free list and processing flow continues to block 56. At block 56 the counter of the free list is incremented and processing flow then returns to decision diamond 34.

According to one embodiment the present invention allows a method of providing, within a single integrated circuit, a standard memory core, where the memory core has registers and control logic which function as a linked list controller. Referring to FIG. 1, data is stored in memory 10, and linked list pointers are stored in list pointer memory 12. List pointer memory 12 has an equivalent memory space as memory 10, where each address in list pointer memory 12 corresponds to the same address space in memory 10. Memory 10 may be a burst memory, where list pointer memory 12 is a subset of locations in memory 10, and represents the base address to memory 10. The difference is that list pointer memory 12 stores information about the next address of data located within a list. Memory 10 stores the data associated with that address. Also within list memory 8 are multiple registers 17.

Each register 14, through 16, and 18 within registers 17 is made up of three portions. Each portion may be a single register or each of the registers may include bit fields which designate each region. For example, within register 14 are included a count portion, a head portion and a tail portion. Register 14 corresponds to a linked list within memory system 5. Register 14 includes a count portion which corresponds to the number of entries in that list. The number of entries indicates the number of addresses that have valid data for this list. Register 14 also includes a head portion which indicates the starting address of the list. The starting address of the linked list is the same in the list pointer memory 12 as in memory 10. At the address designated in the head portion of register 14, main memory will contain data while list pointer memory 12 will contain the next address in the list. Registers 17 also includes a register corresponding to a free list. The free list is used to track those addresses which are not being used in memory 10. Entries in the free list are available for an add operation. Entries are placed in the free list when data is removed from those addresses in memory 10, and entries are removed from the free list as data is added into memory 10.

Referring again to FIG. 1, list memory 8 is a standard memory core having address decoding logic, data registers, read/write control logic, and multiple of bit cells. Control logic 20 includes circuits needed to interpret external signals and execute the appropriate functions. The functioning of control logic 20 is based on chip inputs, including the clock, chip select, add/remove, and list select as defined by FIGS. 2 and 3.

The list registers 17 contain three registers for each list. List registers 17 also includes the free list. The free list is a linked list of all available memory locations in linked list memory, and therefore in memory 10. Each memory location within memory 10 and within memory list pointer memory 12 can only be contained in one linked list. This includes the free list, which is an indication that it is not in any of the other lists. Note that in each of the list registers 17 the head stores the address of the next location to be accessed for a given list. On receiving a request to remove an entry from memory 10, i.e. a read from memory 10, the value in the head for the selected list indicates what is the next address from which data is to be removed from memory 10. The tail stores the address where the last written data resides for a selected list. In effect each list has a series of associated addresses which are to be addressed sequentially. In order to form a sequential data series, the head contains the starting address in that series while the tail contains the ending address. Each list also has a counter which is used to keep track of how many entries are in each list and to determine if the list is empty. An error is generated when a request is received to remove data from an empty list. The free list also has a counter which indicates the number of memory locations which are not being used. When the free list counter is equal to zero all memory locations within memory 10 are in use and no more information can be stored without losing some data.

Referring again to FIG. 2, the flow chart illustrates the operation of one embodiment of the present invention. This flow chart is implemented by the control logic of list memory 8. Here the clock signal initiates a sampling of the input signals to control logic 20. Actions are then taken based on these signals. A select list signal indicates the list upon which the next operation is to be performed. The select list signal is decoded and the corresponding list registers are accessed. The list registers associated with the selected list include the count, the head and the tail. Note that these may all be contained within one register, or may be three distinct individual registers. Additional information may also be provided in other registers associated with each list. The add/remove signal is provided to control logic 20, which then decodes the signal to determine the next operation of list memory 8. A write to memory 10 will require provision of an address in which to store the data. This corresponds to an add function. A read from memory 10 will require provision of an address from which to recover the data. This corresponds to a remove function.

When an add request is received, and the list is selected, the counter associated with the free list is checked to determine if it is equal to zero. This is necessary as discussed above when the free list counter is equal to zero, no more data may be stored in memory 10, without the loss of data, as all memory locations are being utilized. (Note that alternate embodiments may choose to keep the new data and remove the oldest piece of data, or any other piece of data.) If the memory is not full, the free list counter is not equal to zero, therefore new data may be written to memory 10. Note that if memory 10 is full, and the free list counter is equal to zero, control logic 20 will output an error signal. In operation, on power-up the free list counter is set to maximum value, i.e. the size of the memory indicating all locations are available.

On power-up the embodiment illustrated in FIGS. 1 and 2 provides a means of ensuring that every location within memory 10 is utilized at least once. During the initialization period current address register 26 is provided with an address from initial counter 22. Initial counter 22 is reset to zero and incremented on every add operation requested. Alternate embodiments may use any other scheme for incrementing or decrementing counter 22. The initial counter 22 allows lists to be built deterministically and avoids the unknown state of memory on power-up. The use of initial counter 22 ensures that all addresses are assigned into one of the lists. During an initial add request the current address register receives the initial value stored in initial counter 22. Addresses then are sequentially assigned through all addresses to ensure that the complete range of address is assigned into at least one of the lists. This allows maximization of memory 10. Note that addresses are only assigned on add operations. Similarly initial counter 22 is only incremented on add operations.

When a remove occurs from one of the lists, the removed location is added to the free list. In this way a free list is built which provides all available memory locations within memory 10. The free list is used to get the next available unused memory location during an add cycle after the initial counter has expired. The initial counter is only used until each address within memory 10 has been assigned once. After this as adds and removes are performed in memory 10, the corresponding addresses are added to the free list or removed from the free list.

When adding from the free list the current address register is copied with the value stored in the head of the free list and the free list head is loaded with the contents of the linked list memory at the current address. In this way the address which is indicated in the head of the free list becomes the first address, i.e. head, of the list upon which an operation is to be performed. The pointer is then copied from list pointer memory into the head of the free list. This allows the free list to be updated as the address that was in the pointer is now being used for data stored in memory 10. In this way the head of the free list is copied with the contents of the linked list. Note that for an add which uses an address in the free list, the free list counter is decremented and the current number of available locations is continually updated. In this way the current address refers to the address which is the object of the operation currently being performed within memory system 5.

Adding an entry to a list is done to first determine if the list is empty prior to performing the add. This is done by checking the counter associated with the list and determining if the counter does not equal zero. Referring to the discussion above, when the list counter equals zero this indicates that the list is empty. In this case the head of the selected list will be assigned the same value as the current address register of this cycle. When the list is not empty, i.e. the list counter does not equal zero, the current address is added to the list by writing to list pointer memory 12 at the location specified in the specified list tail. The current address is written into this location. The list is updated by changing the contents of the list tail to the value in the current address register and incrementing the list counter.

For a remove, first check the selected list counter to ensure that data exists in the list that is to be accessed. When the list counter is equal to zero, indicating an empty list, an error flag is output by control logic 20. When the list counter is not equal to zero the value in the selected head is provided to the current address register.

Figure 4:
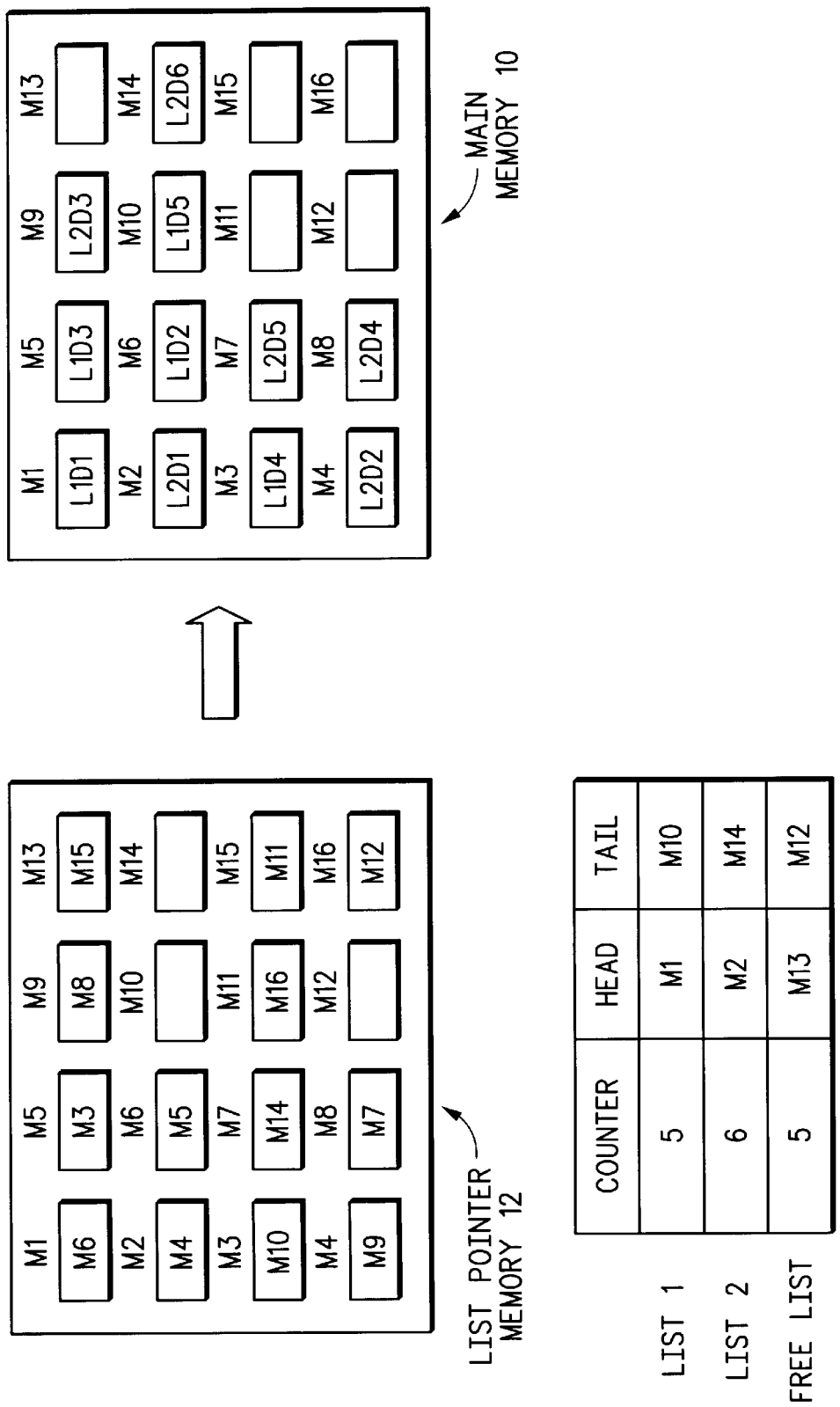
FIG. 4 illustrates an example of the operation of memory system 5 of FIGS. 1–3.

FIG. 4 illustrates one example of the operation of memory system 5 of FIG. 1. Here list pointer memory 12 and memory 10 each contain 16 memory locations, illustrated as memory locations M1 through M16. The table provided illustrates the registers associated with a first list, labeled LIST 1, a second list, labeled LIST 2, and the free list, labeled FREE LIST. As discussed herein above, memory 10 contains data associated with each list, while list pointer memory 12 includes information about the next memory location within each list.

For example, LIST 1 has a head value of M1. This indicates that within memory 10, memory location M1 contains the first data entry in LIST 1. Similarly, within list pointer memory 12, memory location M1 contains the address of the next data entry of LIST 1, which in this example is the address of memory location M6. Continuing with memory 10, the first data entry of LIST 1 is in memory location M1, and is labeled as L1D1. The second data entry of LIST 1 is in memory location M6, and is labeled L1D2. Returning to list pointer memory 12, memory location M6 contains the address of the next data entry of LIST 1, which in this example is M5. Returning again to memory 10, memory location M5 contains data L1D3. The list is then located throughout memory 10 and may be found by starting at the head value of M1 and continuing to the tail value of M10. Memory location M10 contains the last data entry in LIST 1. The counter having a value of 5 indicates that there will be five data entries located within memory 10 associated with LIST 1. In this way, memory 10 stores all of the data necessary for LIST 1, but does not necessarily store them in consecutive memory cells.

The data associated with LIST 1 is found by following the list pointers indicated in list pointer memory 12, starting with the value in the head of LIST 1. The list pointers point to the path from the head to the tail of each list. Similarly, LIST 2 has six memory cells containing data within memory 10. The head, or start, of data for LIST 1 is at memory location M2, which contains data L2D1. The tail for LIST 2 is at memory location M14, which contains data L2D6. The FREE LIST in this example contains five entries in memory 10 which are available for data storage as they are not in use. The head of the FREE LIST is located at memory location M13 and the tail is at memory location M12. In this particular example, the free list proceeds from memory location M13 to memory location M15, which is indicated by looking at the list pointer memory 12, starting at memory location M13. Note that memory location M13 in memory 10 does not contain valid data, as this memory location is on the FREE LIST and is not in use. There will probably be data stored in memory location M13, but this data is not valid for this cycle. The next memory location within the FREE LIST is located at memory location M15 and, referring to list pointer memory 12, memory location M15 directs us to the next memory address which is memory location M11 in the FREE LIST. Continuing, the FREE LIST also includes memory location M16 and has a tail at memory location M12.

As illustrated in the example of FIG. 4, the FREE LIST currently has a head indicated by memory location M13. If the next operation requested is an add operation, it will be necessary to use one of the memory locations that is on the FREE LIST, since the initial counter has expired in this example. In this case it will be the memory location indicated by the head, i.e. memory location M13. Once memory location M13 is assigned to one of the other lists, it must be removed from the free list and therefore the head of the free list will change from memory location M13 to memory location M15, which is the next free location within memory 10, as indicated by list pointer memory 12.

By using the initial counter to ensure that all memory locations within memory 10 have been utilized, the present invention provides a way to maximize the use of the entire memory 10. Here, once each address has been assigned to a list, the free list will then begin to track available addresses within memory 10. Memory locations are added to the free list on remove operations and are removed from the free list on add operations. According to one embodiment of the present invention, the list memory 8 is implemented in hardware, where the list pointer memory 12 includes a plurality of memory locations corresponding to the memory locations in memory 10. According to this embodiment, registers 17 comprises physical registers 14, through 16 and 18. According to an alternate embodiment of the present invention control logic 20 is resident within memory system 5 but external to list memory 8. Control logic 20 may be configured within list memory 8, or may be an ASIC external to list memory 8.

According to one embodiment of the present invention, the initial counter 22 is implemented as a binary counter, but may be implemented using any means for selecting every address within memory 10 once and only once. Note that once every address within memory 10 has been assigned to a list, the initial counter 22 is no longer used. After this initial period all of the addresses provided to current address register 26 are provided from register 17. Note that during the initialization period, i.e. before all addresses within memory 10 have been assigned to a list, the free list is not used. At initialization the free list counter is initialized to the maximum memory size. This is to indicate that all memory locations are available.

According to one aspect of the present invention, a method of implementing a linked list in a memory system includes initiating address assignment, and enabling a counter to count each request for a write to data memory, the counter having a counter value. A data memory address is assigned to each memory location of the list pointer, wherein the data memory address is provided by the counter value. After all memory locations have been assigned at least once by the counter value, the counter is disabled.

According to another aspect of the present invention, a method of implementing a linked list in a memory system involves initiating selection of addresses in the data memory, enabling a counter, wherein the counter has a counter value and wherein the counter is incremented on each request to write data to the data memory. The method continues by selecting a first address corresponding to a first memory location of the data memory, wherein the first address is indicated by the counter value, and providing the first address to a first linked list. Here the first linked list includes a first tail register, and the first address is stored in the first tail register. The first address is then provided to a list pointer memory, wherein the first address is stored at a memory location of the list pointer memory corresponding to the first tail register, after all memory locations of the data memory have been selected exactly once by the counter value, the counter is disabled.

According to another aspect of the present invention, an integrated circuit includes a list pointer memory, a plurality of linked lists coupled to the list pointer memory, and an address selection unit adapted to provide addresses to the list pointer memory and to the plurality of linked lists, the address selection unit comprising a counter, wherein the counter has a counter value which indicates a selected address, and the counter indicates each and every address only once. In one embodiment, the integrated circuit also includes a data memory coupled to the address selection unit, a control unit coupled to the plurality of lists, and a processor coupled to the control unit. The processor is adapted to provide an add/remove signal to the control unit. The processor is adapted to provide a select list signal to the control unit. The list pointer memory and the data memory have an equal number of memory locations. The control unit provides control information to the list pointer memory and to the address selection unit.

Those skilled in the art will recognize that modifications and variations can be made without departing from the spirit of the invention. For example, in one embodiment of the present invention, the head may be located in a separate register. Similarly, the tail may be located in a separate register, or the head and tail may be portions of a single register.

It is intended that this invention encompass all variations and modifications as fall within the scope of the appended claims.

I claim:

1. A method of implementing a linked list in a memory system having a data memory and a list pointer memory, wherein each data memory address is a readable/writeable address capable of being written to more than once and corresponds to a corresponding list pointer memory address and wherein the data memory stores data associated with a data memory address and the list pointer memory is a separate memory portion from the data memory and stores information about a next data memory address associated with the data memory address, the method comprising:

initiating address assignment;

enabling a counter to count each request for a write to data memory, the counter having a counter value;

storing a data memory address to a memory location of the list pointer memory, wherein the data memory address is provided by the counter value;

disabling the counter after all data memory addresses have been provided at least once by the counter value; and after all data memory addresses have been provided at least once by the counter value, storing data memory addresses to corresponding memory locations of the list pointer memory, wherein the data memory addresses are not provided by the counter value.

2. The method of claim 1, further comprising: tracking each request to read from the data memory using a free list to store available addresses in the data memory.

3. The method of claim 2, further comprising:

selecting a first linked list;

providing a second data memory address to the first linked list based on the counter value while the counter is enabled; and providing a third data memory address to the first linked list based on the free list while the counter is disabled.

4. The method of claim 3, wherein:

the first linked list is indicated by a head portion and a tail portion;

the head portion indicates a start address of the first linked list; and the tail portion indicates an end address of the first linked list.

5. The method of claim 4, further comprising:

selecting a second linked list;

providing a fourth data memory address to the second linked list based on the counter value while the counter is enabled; and providing a fifth data memory address to the second linked list based on the free list while the counter is disabled.

6. The method of claim 5, wherein:
   the second linked list is indicated by a second head portion and a second tail portion;
   the second head portion indicates a start address of the second linked list; and
   the second tail portion indicates an end address of the second linked list.

7. The method of claim 1, further comprises: loading a first predetermined value into the counter.

8. The method of claim 7, wherein the counter is disabled when the counter reaches a second predetermined value, wherein the second predetermined value indicates when each and every data memory location has been selected exactly once by the counter value.

9. A method of implementing a linked list in a memory system, the memory system including a data memory, the method comprising:
   initiating selection of addresses in the data memory, wherein each of the addresses in the data memory is a readable/writeable address capable of being written to more than once;
   enabling a counter, the counter having a counter value and wherein the counter is updated on each request to write data to the data memory;
   selecting a first address corresponding to a first memory location of the data memory, wherein the first address is indicated by the counter value;
   providing the first address to a first linked list wherein the first linked list includes a first tail register;
   if the first linked list is not empty, providing the first address to a list pointer memory, the list pointer memory being a separate memory portion from the data memory, wherein the first address is stored at a memory location of the list pointer memory corresponding to the first tail register;
   storing the first address in the first tail register;
   disabling the counter after all memory locations of the data memory have been selected exactly once by the counter value;
   after all memory locations of the data memory have been selected exactly once by the counter value, selecting addresses corresponding to memory locations of the data memory, wherein the addresses are not indicated by the counter value; and
   storing each of the addresses at a corresponding location of the list pointer memory.

10. The method of claim 9, wherein the first linked list further includes a first head register and a first count register.

11. The method of claim 10, further comprising:
    if the first linked list is empty, storing the first address in the first head register; and
    updating the first count register.

12. The method of claim 9, wherein the memory system further includes a free linked list indicating available addresses in the data memory, the method further comprising:
    storing available addresses in the free linked list based on each request to read data from the data memory; and
    after disabling the counter, providing an available address on each request for a write to the data memory.

13. The method of claim 12, wherein providing the available address further comprises:
    selecting a second address corresponding to a second memory location of the data memory, wherein the second address is indicated by the free linked list.

14. An integrated circuit comprising:
    a list pointer memory adapted to store addresses corresponding to a data memory;
    a plurality of linked lists coupled to the list pointer memory; and
    an address selection unit adapted to provide addresses of the data memory to the list pointer memory and to the plurality of linked lists, the address selection unit comprising a counter, wherein the counter has a counter value which indicates a selected address of the data memory, the counter indicates each and every address of the data memory only once, and each selected address is a readable/writeable address capable of being written to more than once; and
    a control unit coupled to the plurality of linked lists, the control unit providing control information to the list pointer memory and to the address selection unit,
       wherein the control information indicates whether the counter has indicated each and every address of the data memory once, and wherein:
          the address selection unit further comprises a multiplexer and a current address register, the multiplexer having an output coupled to the current address register, having inputs coupled to the counter and to the plurality of linked lists, and selecting between the counter and the plurality of linked lists based on the control information from the control unit.

15. The integrated circuit of claim 14, wherein each of the plurality of linked lists comprises at least one register, having a head portion to indicate a start address of a linked list.

16. The integrated circuit of claim 14, further comprising:
    a data memory coupled to the address selection unit, wherein there is a correspondence between memory locations in the list pointer memory and memory locations in the data memory.

17. The integrated circuit of claim 16, wherein the data memory is capable of burst transfers of data.

18. The integrated circuit of claim 14, further comprising:
    a data memory coupled to the address selection unit, wherein each memory location in the list pointer memory corresponds to a unique memory location in the data memory;
    a control unit coupled to the plurality of lists, the control unit providing control information to the list pointer memory and to the address selection unit; and
    a processor coupled to the control unit, the processor adapted to provide an add/remove signal to the control unit, the processor adapted to provide a select list signal to the control unit.

19. The integrated circuit of claim 14, wherein each of the plurality of linked lists comprises at least one register, having a tail portion to indicate an end address of the linked list.

* * * * *